J. L. ALTER & C. A. EINERT.
ATTACHMENT FOR DOUBLETREES.
APPLICATION FILED AUG. 15, 1908.
926,379.
Patented June 29, 1909.
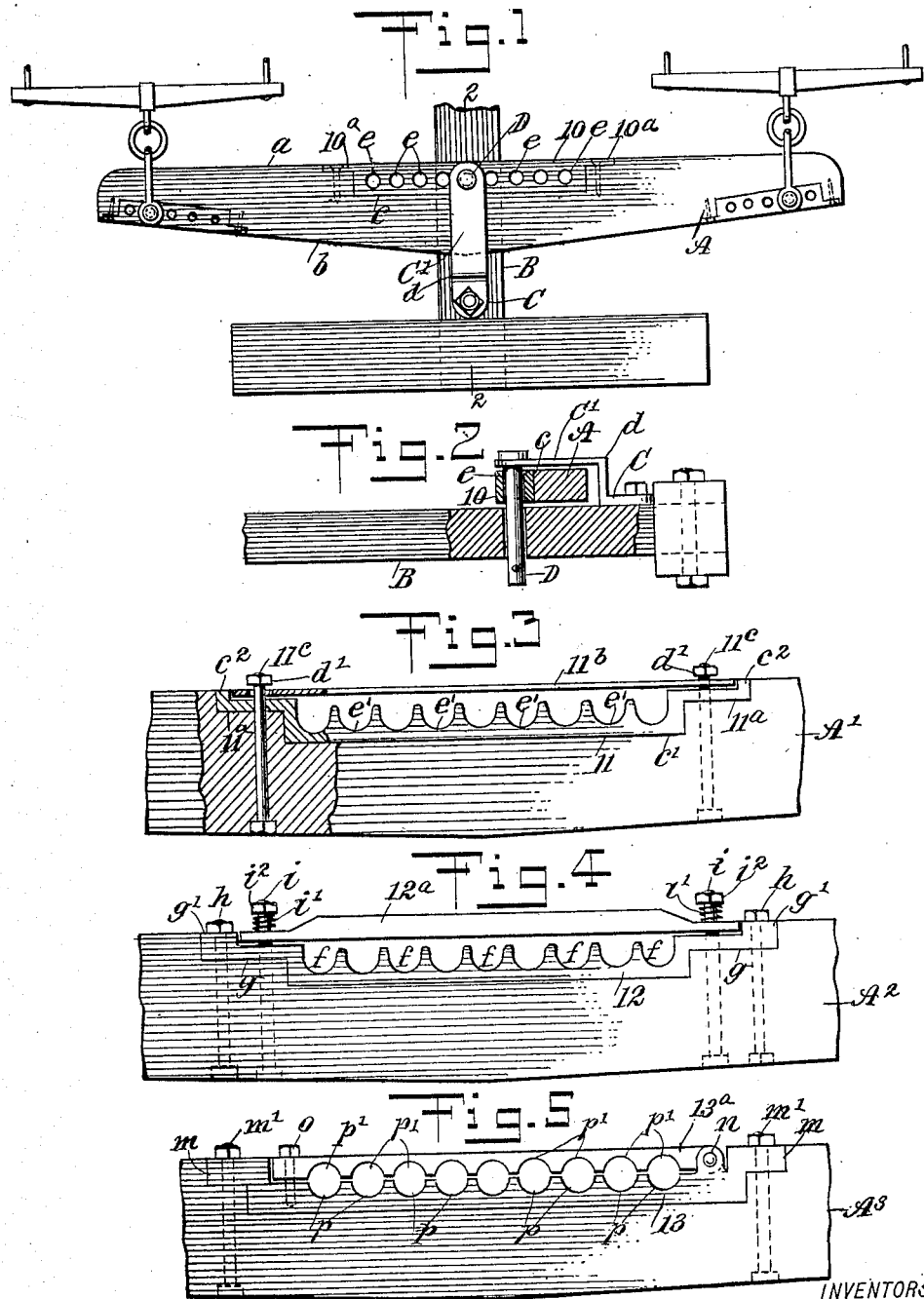

UNITED STATES PATENT OFFICE.

JAMES L. ALTER, OF REMINGTON, INDIANA, AND CARL A. EINERT, OF CLARKSVILLE, ARKANSAS.

ATTACHMENT FOR DOUBLETREES.

No. 926,379.      Specification of Letters Patent.      Patented June 29, 1909.

Application filed August 15, 1908. Serial No. 448,673.

*To all whom it may concern:*

Be it known that we, JAMES L. ALTER, a resident of Remington, in the county of Jasper and State of Indiana, and CARL A. EIN-ERT, a resident of Clarksville, in the county of Johnson and State of Arkansas, have invented a new and Improved Attachment for Doubletrees, of which the following is a full, clear, and exact description.
The purpose of our invention is to provide a novel, simple attachment for an ordinary double tree, which enables the point of draft strain upon the double tree to be quickly changed, and thus compensate for the difference between the strength of a light team or single draft animal, and a stronger team of draft animals that are connected with the opposite ends of the double tree.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a plan view of one example of our improvement as applied upon a double tree; Fig. 2 is a transverse sectional view, substantially on the line 2—2 in Fig. 1; Fig. 3 is a partly sectional plan view of another form of the improvement; Fig. 4 is a plan view of another form of construction; and Fig. 5 is a plan view of still another modification.

Referring to Figs. 1 and 2 of the drawings, the double tree A, shown to illustrate the application of the improved "evener" device, is of the usual form, consisting preferably of a wooden beam, straight at its front edge $a$ and sloped from near the center toward each end at the opposite edge $b$. In the front edge $a$ of the double tree A an elongated recess $c$ is formed, which extends an equal distance toward each end from the longitudinal center thereof. In the recess $c$ is fitted a metal block 10, that is closely embedded therein, and at each end is provided with a flange $10^a$, likewise embedded in the edge $a$, said flanges being perforated, and the block or evener body 10 is secured in place by screws inserted through the said perforations into the double tree.

The double tree is loosely secured upon a wagon tongue B, by means of a clevis plate C, bolted at one end upon the tongue at the rear of the double tree, and offset at $d$, providing a member C' that extends over the upper side of the double tree and the block
10. A perforation is formed in the member C' of the clevis plate C, and in the block 10 a series of spaced perforations $e$ is formed, either of said perforations being adapted for receiving a pivot-bolt D, that passes down through the perforation in the member C' of the clevis plate.

In Fig. 3, the double tree A', in complete form is similar to the double tree A, and in the front edge thereof a recess $c'$ is formed.
An evener block 11 of oblong rectangular form, is embedded in the recess $c'$, said block having a flange $11^a$ extended from each end, said flanges being seated in recesses of less depth than the recess $c'$. Upon the outer end of each flange $11^a$, a transverse rib $c^2$ is formed, that projects forwardly. A clamping bar $11^b$ in elongated plate form, is seated upon the flanges $11^a$ between the ribs $c^2$, and in perforations transversely formed in the body of the double tree A', flanges $11^a$ and clamping bar $11^b$, bolts $11^c$ are inserted, having nuts $d'$ mounted upon the threaded forward ends thereof, and which by adjustment serve to clamp the bar $11^b$ upon the front side of the evener block 11. A series of similar round bottomed recesses $e'$ is formed in the evener block 11, said recesses which are equally spaced apart being open at the front of the block.

It will be seen that the double tree A' may be mounted upon a tongue B shown in Figs. 1 and 2, and by means of a clevis plate C, and a pin D, be adjustably connected therewith, the bolt D being engaged with the evener block 11 by insertion down through a selected recess $e'$ wherein said pivot bolt is loosely retained by the clamping bar $11^b$.

In Fig. 4, the double tree $A^2$ is substantially similar to the double tree A', having an elongated recess in its front edge, wherein an evener block 12 is seated, said block having recesses $f$ therein similar to the recesses $e'$. It will be noted that flanges $g$ are formed on the ends of the evener block, and have flattened ribs $g'$ on their ends, which are wider than the ribs $c^2$ of the evener block 11, and through said ribs $g$ bolts $h$ are inserted, that pass through alined perforations in the double tree $A^2$, and nuts on the ends of said bolts serve to clamp the evener on the double tree. Upon the flanges $g$, between the ribs $g'$, the ends of a clamping bar $12^a$, are respectively seated and loosely secured by bolts $i$ that pass through the double tree $A^2$ and project through the flanges $g$ far enough to receive coiled springs $i'$ thereon, which are pressed upon the clamping bar $12^a$ by nuts $i^2$ that are screwed upon the extremities of the bolts. It will be noted that the clamping bar $12^a$, due to the force of the springs $i'$, will retain the body of a pivot bolt such as D, in either recess $f$ in which it may be placed.

In Fig. 5, a further modification of the evener block is shown. In this construction of the improvement, the elongated block 13 is seated in a recess at the front edge of a double tree $A^3$, and is provided with flanges $m$ at its ends, that are embedded in the double tree and therein secured by bolts $m'$ and nuts that bear upon the flanges $m$. The front of the evener block 13 is recessed from points near the flanges $m$, and in said recess a clamping bar $13^a$ is rockably held by a hinge joint $n$, that connects one end of said clamping bar with the evener block near the flange $m$. The opposite end of the clamping bar $13^a$ is adjustably clamped upon the evener block by a screw bolt $o$, loosely inserted through the other flange $m$ near its end, and screwed into a tapped perforation in the evener block 13. A plurality of scalloped openings $p$ are formed in the front edge of the evener block 13, and a corresponding number of similar scallops $p'$ are formed in the rear edge of the clamping bar $13^a$, the scallops $p$, $p'$ being arranged oppositely in pairs. It will be seen that a coupling pin or bolt such as D, may be inserted down through any of the openings formed in the evener block and clamping bar by the formation and arrangement of the scallops $p$, $p'$ therein, and thus loosely secure the double tree $A^3$ upon a tongue or other projection from the load to be drawn.

The several examples of the construction of the improvement, hereinbefore described, all embody an evener block having openings in the front edge and embedded in the front edge of a double tree, said openings all co-acting with means for retaining a pivot bolt in an opening at a desired point, for loosely securing the double tree upon a tongue or the like, at the center of the double tree or any selected point at either side of the center thereof.

As before stated, the purpose of the invention is to enable a double tree for applying draft force to a load, to be positioned at a proper distance from its longitudinal center in engagement with the load, and thus by the leverage afforded at one end of the double tree, even the load to be drawn, if a strong horse or team is hitched to the shorter arm of the double tree and a weaker horse or team is connected with the longer arm thereof.

Having thus described our invention, we claim as new and desire to secure by Letters Patent:

1. In a draft tree, an evener block off-set between its ends and having in said off-set portion a plurality of recesses, a clamping bar extending over the off-set portion of the evener block with its ends resting upon the ends of the said block, and means for securing the block and bar to the tree.

2. A draft tree having a recessed edge, an evener block off-set between its ends and having a plurality of recesses in said off-set portion, and a clamping bar secured at its ends upon the evener block over the off-set portion of said block.

3. The combination with a tongue or the like, a clevis plate, and a pivot bolt engaging a perforation in said clevis plate, of a double tree recessed in the front edge, an evener block embedded in said recess, means for securing the evener block in the recess, said block having an off-set portion intermediate of its ends and a series of openings in the front edge of the said off-set portion, a clamping bar, and means for adjustably securing said bar on the front side of the evener block.

4. The combination with a double tree recessed in its front edge, and an evener block secured in said recess, said block having scallops in the front face thereof, of a clamping bar perforated near each end, studs projected from the evener block and passing loosely through the perforations in the clamping bar, springs on the studs between the block and bar, and nuts on the ends of said studs for holding the clamping bar on said studs.

5. The combination with a draft tree, of an evener block having a plurality of recesses and secured to one edge of the tree, and a yieldingly mounted clamping bar extending over the recesses of the evener block.

6. The combination with a draft tree having a recess in one edge, of a recessed evener block fitting in the recess of the tree and having flanged ends and ribs on said ends, a clamping bar having its ends resting upon the flanges of the evener block, and means for securing the block and bar to the tree.

In testimony whereof we have signed our names to this specification in the presence of two subscribing witnesses.

JAMES L. ALTER.
CARL A. EINERT.

Witnesses to the signature of James L. Alter:
WILLIAM TOWNSEND,
LEVI HAWKINS.

Witnesses to the signature of Carl A. Einert:
WESS TAYLOR,
WILL. F. MORGAN.